UNITED STATES PATENT OFFICE.

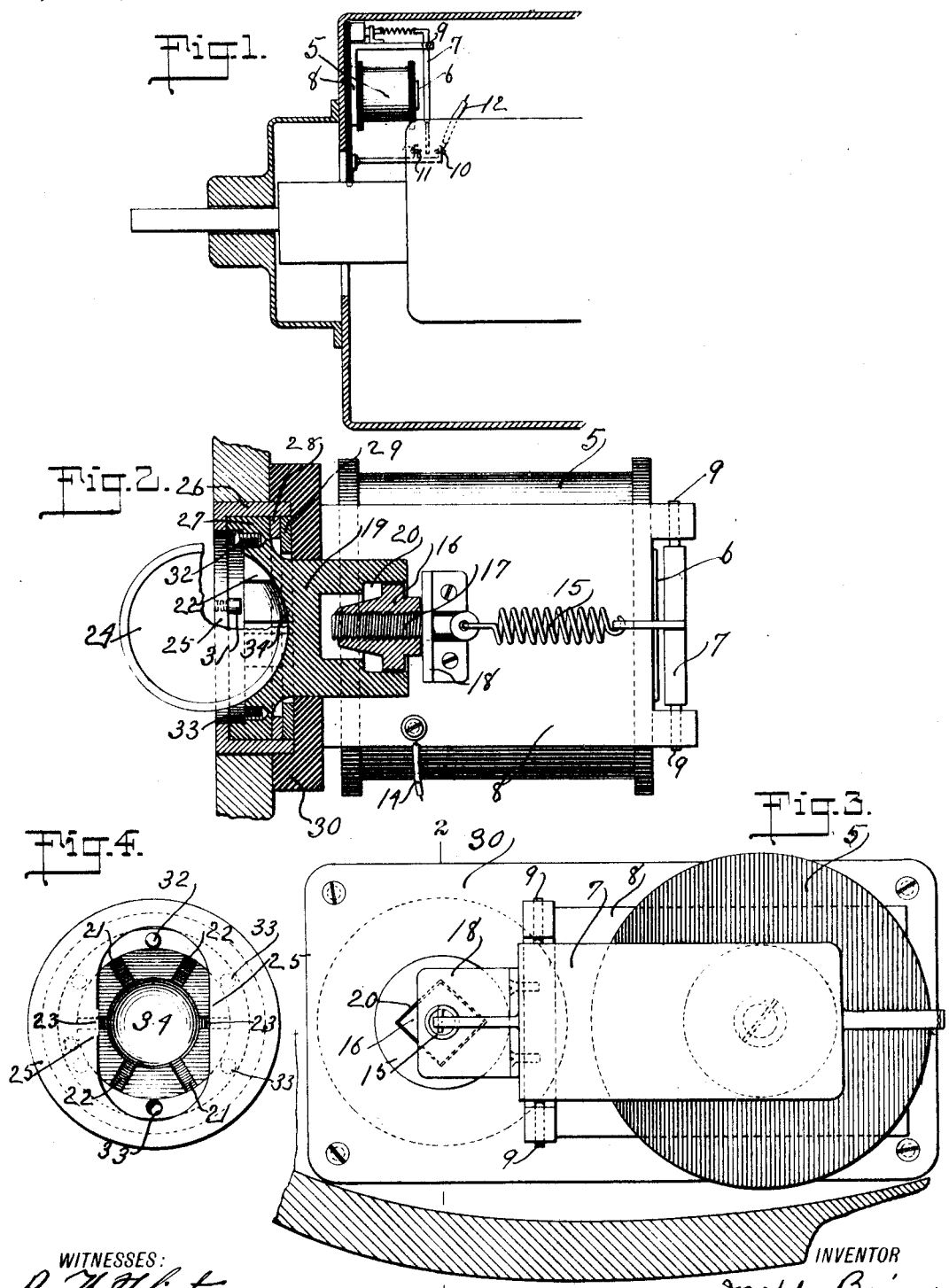

JOSEPH BIJUR, OF NEW YORK, N. Y.

CONTROLLING MECHANISM FOR DYNAMOS, MOTORS, &c.

1,188,884.  Specification of Letters Patent.  Patented June 27, 1916.

Application filed December 6, 1913. Serial No. 804,963.

*To all whom it may concern:*

Be it known that I, JOSEPH BIJUR, a citizen of the United States, and a resident of New York, borough of Manhattan, in the county of New York and State of New York, have made and invented certain new and useful Improvements in Controlling Mechanism for Dynamos, Motors, &c., of which the following is a specification.
My invention relates to controlling or regulating mechanism for dynamos, motors, and similar dynamo-electric machines, the purpose of which mechanism is to maintain a constant voltage, current, or energy output of the machine as the speed thereof varies; and the object of my invention is to provide improved means for adjusting an element of the regulating mechanism which is affected by and responsive to changes in the voltage, current, or energy output of the machine, for example, a relay, so that by adjusting the adjusting means the magnitude of the constant voltage, current, or energy output may be changed or varied at will within predetermined limits.

The element of the regulating mechanism which is directly affected by changes or variations in the voltage, current, or energy output of the machine is extremely sensitive, and it is necessary that the means for adjusting the same be so arranged as to avoid injury thereto when the same is adjusted. Furthermore, slight changes in the adjustment of the element in question will ordinarily be sufficient to secure the desired change in the voltage, current, or energy output.

In view of these considerations, my invention comprises adjusting means loosely connected with the element of the regulating mechanism to be adjusted, so that the same cannot be injured or disarranged during the process of adjustment; and which adjusting means is so constructed that its range of movement is limited in such a way that any considerable adjustment of the regulating mechanism is necessarily accomplished by successive slight movements of the adjusting means.
A further object of my invention is to provide an adjusting device for the purpose stated which may be operated by a coin or similar article, thus dispensing with the necessity of a special tool or implement and providing an arrangement such that excessive force cannot be applied to the adjusting means nor to the regulating mechanism to its possible injury.

With the above and other objects of invention in view, my invention consists in the improved adjusting devices for electrical regulators illustrated in the accompanying drawing and hereinafter described and claimed, and in such variations and modifications thereof as will be obvious to those skilled in the art to which my invention relates.

In the drawing accompanying and forming a part of this application and wherein the preferred embodiment of my invention is illustrated: Figure 1 is a view illustrating certain elements of an electrical regulating device and the usual location thereof with reference to the dynamo-electric machine to be regulated; Fig. 2 is a view showing my improved adjusting device in section upon a plane indicated by the line 2—2, Fig. 1, and as applied to a relay which forms a part of the regulating mechanism; Fig. 3 is a view showing the relay and adjusting devices as seen from a position to the right of Fig. 2, and; Fig. 4 is a view showing my improved adjusting device as seen from the outside of the casing of the machine with which it is used.

In the accompanying drawing, the reference numeral 5 designates a suitable electromagnet, the flow of electricity through the coil of which varies with the voltage generated by the dynamo, assuming the regulating device is used to regulate a dynamo. The coil in question is commonly connected directly across the conductors leading from the dynamo which is illustrated in a conventional manner in Fig. 1, from which it will be understood that variations in the electromotive force generated by the dynamo will be accompanied by corresponding changes in the current flowing through the coil of the electro-magnet, and, consequently, by changes in the pull exerted by the core 6 of the magnet upon its armature 7.

The core of the electro-magnet is secured to a bracket 8 right-angular in form, as shown, and to the free end of which the armature 7 is pivotally connected as at 9 and the free end of which armature plays between the stop 11 and fixed contact 10, from which latter the wire 12 leads. This wire forms part of a circuit including any suitable source of electricity and having a return wire 14, which circuit may be made or broken at the contact 10, according to the position of the armature, to thereby control the voltage of the dynamo.

The mechanism thus far described forms an ordinary relay for controlling the circuit above referred to and which relay is responsive to changes in voltage between the leads of the dynamo, and through which a constant voltage thereof may be maintained. The relay is provided with a spring 15 acting in opposition to the pull exerted by the core of the electro-magnet 5, the tension of which spring may be changed by rotating a nut 16 upon a threaded stirrup 17 with which one end of the spring 15 is connected and which nut bears against a fixed abutment 18 secured to the bracket 8, from which it will be obvious that the magnitude of the constant voltage maintained by the regulating device may be changed by varying the tension of the spring 15 by rotating the nut 16.

My improved adjusting device is shown as employed for the purpose of rotating the nut 16 and thus changing at will the constant voltage maintained by the relay as above explained, and comprises a rotary member 19 the inner end of which is loosely connected with the nut 16 as by means of a recess or socket 20 within which the nut lies, the recess and nut both being square in cross-section as shown in Fig. 3 so that rotary motion of the member 19 will be communicated to the nut, as will be understood. The outer end of the rotary member 19 is provided with a plurality of diametrically extending seats each shown as made up of two oppositely located grooves 21, 22, 23, which seats are designed to receive an operating member, preferably a coin 24 as shown in Fig. 2, whereby the rotary member may be rotated upon its axis.

In order to limit the amount of rotary motion which may be communicated to the member 19 while the operating member 24 is resting within any particular seat, I provide a stop or stops into contact with which the said operating member will come after a comparatively limited amount of rotary motion has been imparted to said rotary member, so that if said member is to be rotated further the operating member must be removed from the seat in which it rests and placed in another seat. Two such stops are shown at 25, Fig. 4, which stops, as will be seen by reference to said figure, extend partially over the seat formed by the grooves 23 and beneath which stops the outer ends of the seats pass as the rotary member is rotated.

It will be seen that the adjacent edges of the stops above referred to are closer to one another than the length of the seats in which the operating member 24 rests so that as the member 19 is rotated the operating member will engage the stops and prevent further motion after a comparatively slight rotary motion has been imparted to the said rotary member, thus necessitating successive removals of the operating member and the re-insertion thereof into other seats, if any considerable amount of rotary motion is to be imparted to the rotary member. The stops 25 are shown as formed integrally with a sleeve 26 thus forming a sort of a guard plate having an opening the length of which is greater and the width less than the length of the seats, and through which opening the operating member 24 may be inserted into the seats provided to receive it. The end of the rotary member which is provided with seats is provided also with a peripheral flange 27 which fits within the sleeve 26 whereby the sleeve forms a bearing for the rotary member, which member is held in place within the sleeve by washers 28, 29, one of which is commonly split to introduce friction and prevent accidental rotation of the rotary member. The flange and overhanging stops or guards are secured in any way as by means of suitable lugs to an insulating supporting plate 30 to which plate the relay hereinbefore referred to is also commonly secured. The relay and other regulating mechanism is commonly placed within the casing of the machine and the sleeve 26 commonly lies within an opening formed in the wall thereof, as shown in Figs. 1 to 3, so that the rotary member may be rotated and adjustment of the regulating mechanism effected from the exterior of the dynamo.

In order to limit the total rotary motion imparted to the rotary member 19 I provide it with a lug or projection adapted to contact with a second fixed lug at the end of the maximum amount of rotary movement contemplated for said rotary member. Thus, referring to Figs. 2 and 4, the reference numeral 31 designates a lug carried by one of the stops 25, while 32 is a lug or pin carried by the rotary member 19 and at such a distance from the axis of rotation thereof that it will engage the lug 31 and thus arrest movement of said member after a certain predetermined amount of movement has occurred. Preferably, several holes 33 are provided in the rotary member into any one of which the lug or pin 32 may be placed to thereby provide for various amounts or extents of movement of the member 19 before its motion is arrested. The rotary member 19 is provided with a central recess 34 with which the slots 21, 22, 23, communicate, the purpose of which is to prevent the said member from being rotated by a tool, for example, a screw driver, narrower than the minimum distance between the stops 25, as would be possible if the continuity of the slots was not interrupted by the recess.

From the premises it will be obvious that the adjustment of the regulating mechanism of the machine with which my device is used is accomplished by small increments, as but a slight amount of rotary motion can be imparted to the rotary member before the operating member by which it is being rotated comes into contact with the fixed stops hereinbefore referred to. Such a slight adjustment is commonly sufficient to secure the desired change in voltage, current, or energy output of the machine; but, if more adjustment is necessary, the operating member may be removed from its seat and re-inserted in another seat, whereupon another slight movement may be imparted to the rotary member. Finally, the fact that the member 19 is loosely connected with the element of the regulating mechanism to which motion is communicated, prevents the delicate regulating mechanism from being injured by force communicated to it during the adjustment thereof.

Having thus described and explained my invention, I claim and desire to secure by Letters Patent:

1. In a device of the class described, a rotary member having a plurality of diametrically extending seats adapted to receive an operating member; and a stop member extending partially across said rotary member and beneath which the ends of said seats pass as said rotary member is rotated.

2. In a device of the class described, a rotary member having a plurality of diametrically extending seats adapted to receive an operating member; and oppositely located stops extending partly across said rotary member and the minimum distance between which stops is less than the length of said seats.

3. In a device of the class described, a rotary member having a plurality of diametrically extending seats formed in one of its ends and which seats are adapted to receive an operating member; and a guard overlying the end of said rotary member and having an opening through which access may be had to said seats, the length of said opening being greater than the length of said seats and the side walls of which opening approach closer to one another than the length of said seats.

4. In a device of the class described, a rotary member having a plurality of diametrically extending seats adapted to receive an operating member; a stop member extending partially across said rotary member and beneath which the ends of said seats pass as said rotary member is rotated; and means for limiting the rotary movement of said rotary member.

5. In a device of the class described, a rotary member having a plurality of diametrically extending seats adapted to receive an operating member; oppositely located stops extending partly across said rotary member and the minimum distance between which stops is less than the length of said seats; a lug carried by one of said stops; and a second lug carried by said rotary member and adapted to engage said first-mentioned lug to thereby limit the rotary movement of said rotary member.

6. In a device of the class described, a rotary member having a plurality of diametrically extending seats formed in one of its ends and which seats are adapted to receive an operating member; a guard overlying the end of said rotary member and having an opening through which access may be had to said seats, the length of said opening being greater than the length of said seats and the side walls of which opening approach closer to one another than the length of said seats; and a recess formed in the other end of said rotary member and the walls of which are in operative engagement with an element to which rotary motion is to be communicated.

7. In a device of the class described, a rotary member having a plurality of diametrically extending seats formed in one of its ends and which seats are adapted to receive an operating member; and a sleeve within which the end aforesaid of said rotary member rotates and which sleeve is provided with a stop extending partially across the end of said rotary member and beneath which the ends of said seats pass as said rotary member is rotated.

8. In a device of the class described, a rotary member having a plurality of diametrically extending seats formed in one of its ends and which seats are adapted to receive an operating member; and a sleeve within which the end aforesaid of said rotary member rotates and which sleeve is provided with oppositely located stops extending partially across the ends of said rotary member and the minimum distance between which stops is less than the length of said seats.

9. In a device of the class described, a rotary member having a plurality of diametrically extending seats formed in one of its ends and which seats are adapted to receive an operating member; a sleeve within which the end aforesaid of said rotary member rotates and which sleeve is provided with a stop extending partially across the end of said rotary member and beneath which the ends of said seats pass as said rotary member is rotated; a lug carried by said stop; and a second lug carried by said rotary member and adapted to engage said first-mentioned lug to thereby limit the rotary movement of said rotary member.

10. In a device of the class described, a rotary member having a plurality of diametrically extending seats formed in one of its ends and which seats are adapted to receive an operating member; a sleeve within which the end aforesaid of said rotary member rotates and which sleeve is provided with oppositely located stops extending partially across the ends of said rotary member and the minimum distance between which stops is less than the length of said seats; a lug carried by one of said stops; and a second lug carried by said rotary member and adapted to engage said first-mentioned lug to thereby limit the rotary movement of said rotary member.

11. In a device of the class described, a rotary member having a plurality of diametrically extending seats formed in one of its ends and which seats are adapted to receive an operating member; a sleeve within which the end aforesaid of said rotary member rotates and which sleeve is provided with a stop extending partially across the end of said rotary member and beneath which the ends of said seats pass as said rotary member is rotated; and a recess formed in the other end of said rotary member and the walls of which are in operative engagement with an element to which rotary motion is to be communicated.

12. In a device of the class described, a rotary member having a plurality of diametrically extending seats formed in one of its ends and which seats are adapted to receive an operating member; a sleeve within which the end aforesaid of said rotary member rotates and which sleeve is provided with oppositely located stops extending partially across the ends of said rotary member and the minimum distance between which stops is less than the length of said seats; and a recess formed in the other end of said rotary member and the walls of which are in operative engagement with an element to which rotary motion is to be communicated.

13. In a device of the class described, a rotary member having a plurality of diametrically extending seats adapted to receive an operating member; oppositely located stops extending partly across said rotary member and the minimum distance between which stops is less than the length of said seats; and means whereby said rotary member may be loosely connected with an element to be adjusted.

14. In a device of the class described, a rotary member having a plurality of diametrically extending seats formed in one of its ends and which seats are adapted to receive an operating member; a guard overlying the end of said rotary member and having an opening through which access may be had to said seats, the length of said opening being greater than the length of said seats and the side walls of which opening approach closer to one another than the length of said seats; and means whereby said rotary member may be loosely connected with an element to be adjusted.

15. In a device of the class described, a rotary member having a plurality of diametrically extending seats adapted to receive an operating member; oppositely located stops extending partly across said rotary member and the minimum distance between which stops is less than the length of said seats; a lug carried by one of said stops; a second lug carried by said rotary member and adapted to engage said first-mentioned lug to thereby limit the rotary movement of said rotary member; and means whereby said rotary member may be loosely connected with an element to be adjusted.

16. In a device of the class described, a rotary member having a plurality of diametrically extending seats formed in one of its ends and which seats are adapted to receive an operating member; a sleeve within which the end aforesaid of said rotary member rotates and which sleeve is provided with oppositely located stops extending partially across the ends of said rotary member and the minimum distance between which stops is less than the length of said seats; and means whereby said rotary member may be loosely connected with an element to be adjusted.

17. In a device of the class described, a rotary member having a plurality of diametrically extending seats formed in one of its ends and which seats are adapted to receive an operating member; a sleeve within which the end aforesaid of said rotary member rotates and which sleeve is provided with oppositely located stops extending partially across the ends of said rotary member and the minimum distance between which stops is less than the length of said seats; a lug carried by one of said stops; a second lug carried by said rotary member and adapted to engage said first-mentioned lug to thereby limit the rotary movement of said rotary member; and means whereby said rotary member may be loosely connected with an element to be adjusted.

18. In a device of the class described, a rotary member having a plurality of diametrically extending seats adapted to receive an operating member and the central portion of which member is provided with a recess; and a stop member extending partially across said rotary member and beneath which the ends of said seats pass as said rotary member is rotated.

19. In a device of the class described, a rotary member having a plurality of diametrically extending seats adapted to receive an operating member and the central portion of which member is provided with a recess; and oppositely located stops extending partly across said rotary member and the minimum distance between which stops is less than the length of said seats.

20. In a device of the class described, a rotary member having a plurality of diametrically extending seats formed in one of its ends and which seats are adapted to receive an operating member, the central portion of said end being provided with a recess; and a guard overlying the end of said rotary member and having an opening through which access may be had to said seats, the length of said opening being greater than the length of said seats and the side walls of which opening approach closer to one another than the length of said seats.

Signed at New York borough of Manhattan in the county of New York and State of New York this 2nd day of December, A. D. 1913.

JOSEPH BIJUR.

Witnesses:
 ANNA V. WALSH,
 GEORGE E. COOK.